UNITED STATES PATENT OFFICE.

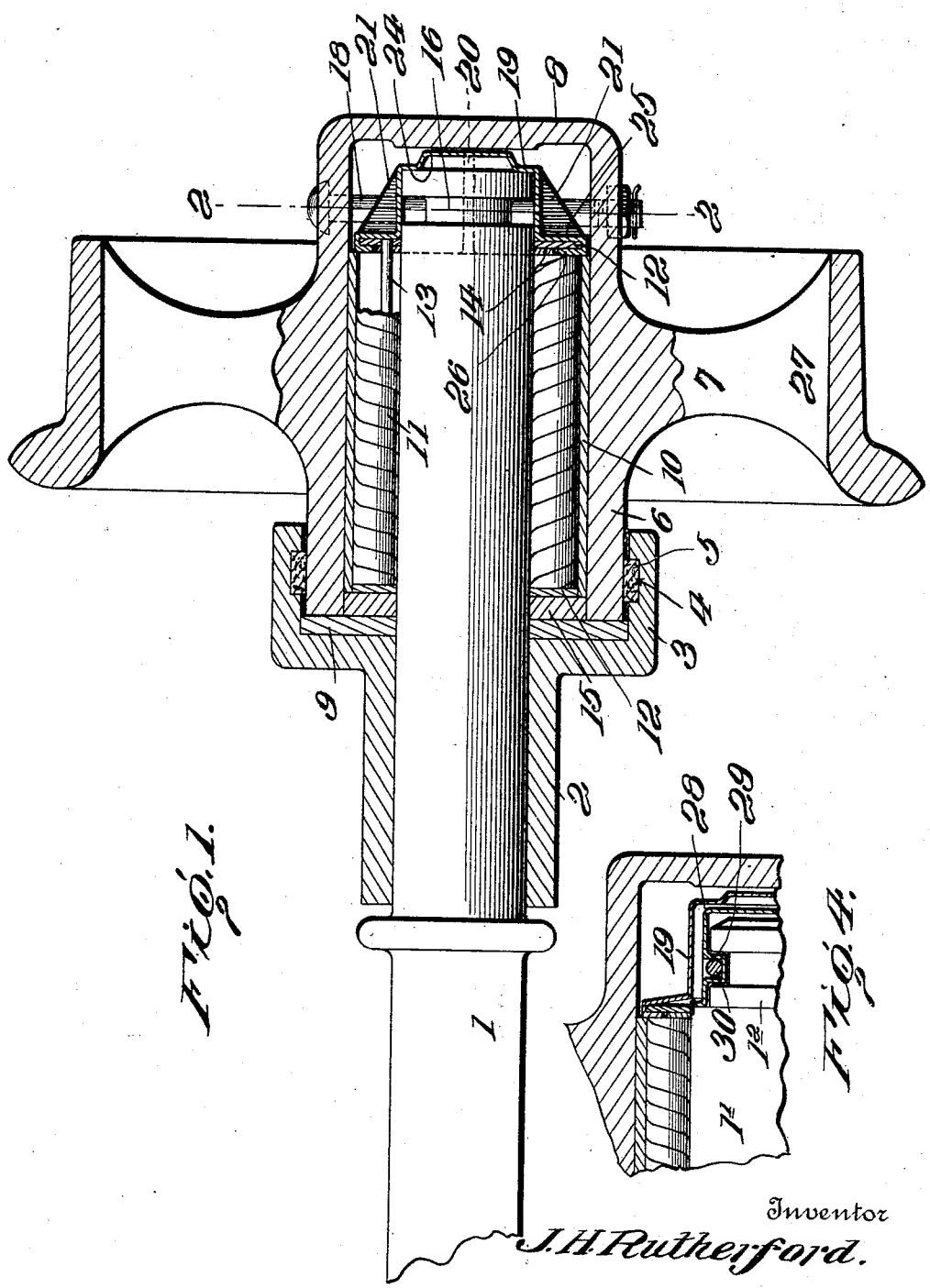

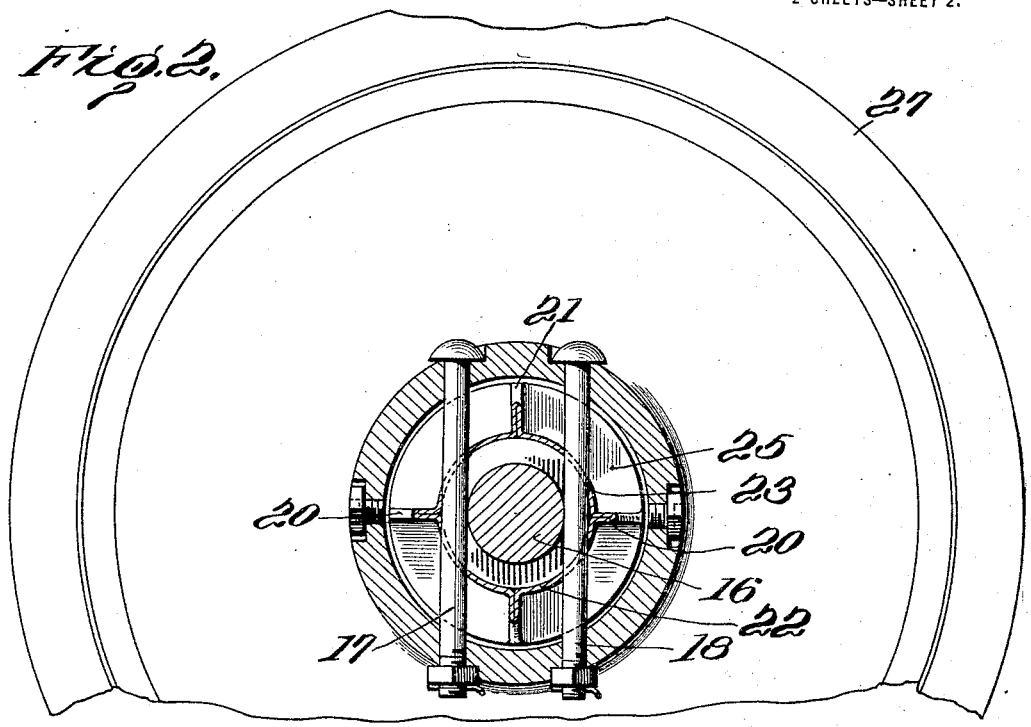
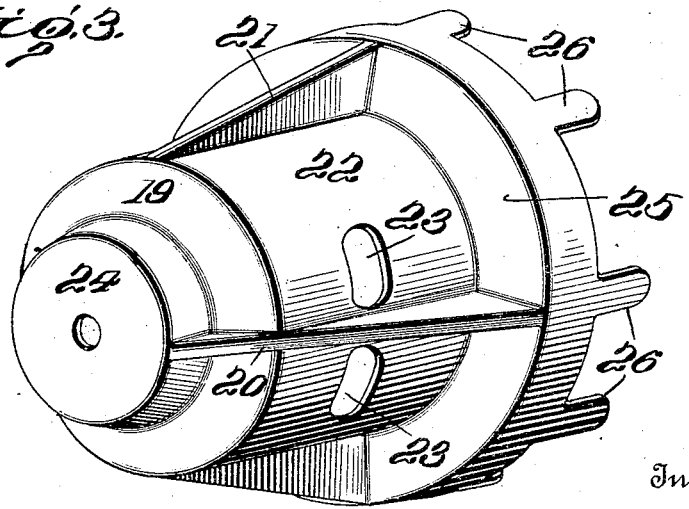

JOHN H. RUTHERFORD, OF KNOXVILLE, TENNESSEE.

MINE-CAR-WHEEL-ATTACHING DEVICE.

1,308,996. Specification of Letters Patent. Patented July 8, 1919.

Application filed February 15, 1919. Serial No. 277,333.

*To all whom it may concern:*

Be it known that I, JOHN H. RUTHERFORD, a citizen of the United States, residing at Knoxville, in the county of Knox and State of Tennessee, have invented certain new and useful Improvements in Mine-Car-Wheel-Attaching Devices, of which the following is a specification, reference being had therein to the accompanying drawing.

This invention relates to certain new and useful improvements in mine car wheel attaching devices, the object being to provide means for attaching the car wheel to the axle in such a manner that lateral movement and friction will be eliminated.

Another and further object of the invention is to provide means for attaching the roller bearing cage to the axle in such a manner that the cage will be held firmly in position within the hub of the wheel.

Another and further object of the invention is to provide a car wheel attaching device which is exceedingly simple and cheap in construction, and one which can be readily applied to the various types of roller bearings and car wheel constructions without changing the general construction to any extent.

Other and further objects and advantages of the invention will be hereinafter set forth and novel features thereof defined by the appended claims.

In the drawings:

Figure 1 is a longitudinal vertical section through a wheel showing the application of my improved attaching device thereto.

Fig. 2 is a section taken on line 2—2 of Fig. 1.

Fig. 3 is a perspective view of the cup-shaped member for securing the roller bearing cage to the axle, and Fig. 4 is a detail section through a slightly modified form.

Like numerals of reference refer to like parts in the several figures of the drawings.

In the drawings 1 indicates an axle mounted in a bearing 2 which is provided with an enlargement forming a flange 3 having an annular interior groove 4 carrying a packing 5 adapted to engage the flange 6 of the hub 7, as clearly shown in Fig. 1. The hub is provided with a closed outer end 8 and an open inner end which engages a packing or wear plate 9.

Arranged within the bore of the hub is a roller bearing cage 10 which may be of any of the well known types now in use having a series of roller bearings 11 mounted between disks 12 which are secured together by rods 13. The outer disk 12 of the cage is spaced from the ends of the roller bearings 11 by a ring 14, as clearly shown in Fig. 1. The inner end of the roller bearing cage 10 engages a washer 15, and while I have described a particular construction of hub and bearing I do not wish to limit myself to the construction shown, as my attaching device, as will be hereinafter fully described, is capable of being used on any of the well known constructions of car wheels and bearings now in use.

The outer end of the axle 1 is provided with an annular groove 16 adapted to receive bolts 17 and 18 extending through the hub, as clearly shown in Fig. 2, for holding or securing the hub in position upon the axle in such a manner that the same can rotate freely.

Arranged over the outer end of the axle is a cup-shaped member 19 which is provided with reinforcing ribs 20 and 21. The cup-shaped member being preferably pressed out of steel and is provided with a portion 22 adapted to fit the axle snugly having openings 23 through which the bolts 17 and 18 pass for locking the cup-shaped member to the axle. The outer end of the cup-shaped member is reduced, as shown at 24, and is provided with an opening. The inner end of the cup-shaped member is enlarged as shown at 25 to receive the outer disk 12 of the bearing cage, said enlargement having a series of tongues 26 which are adapted to be crimped around the outer disk 12 of the bearing cage over the ring 14, as clearly shown in Fig. 1.

The hub 7 forms an integral part of the wheel 27 which may be of any desired construction. I preferably form the complete wheel of steel, but the construction of the wheel and the material used forms no part of this invention.

In the modification shown in Fig. 4 the outer end of the axle 1' is reduced, as shown at 1², and the auxiliary cup-shaped member 28 is placed over the axle before the bearing retaining member 19 is placed in position, said cup-shaped member having an annular groove 29 formed by providing the same with an annular interior projection, said projection extending into the groove of the axle, as clearly shown. By this construction the annular groove is formed in the auxiliary cup-shaped member to receive the locking bolts 30 for retaining the wheel on the axle and the cage to the axle.

From the foregoing description it will be seen that I have provided a mine car wheel retaining device in which a roller bearing cage is mounted within the hub of the wheel and secured to the axle by a member embracing the end of the axle which is secured in position by the bolts employed for securing the wheel on the axle.

What I claim is:—

1. In a mine car wheel, the combination with an axle having an annular groove, of a wheel mounted on the axle having a roller bearing cage, a cup-shaped member embracing the end of the axle having means for connecting the same to the bearing cage, and bolts passing through the hub of the wheel and cup-shaped member and groove of the axle.

2. The combination with an axle having an annular groove adjacent its outer end, of a car wheel provided with a hub having a closed outer end mounted on said axle, a bearing cage disposed within said hub, a cup-shaped member being provided with tongues adapted to be secured to the bearing cage, and bolts passing through the hub of said wheel cup-shaped member and groove of said axle.

3. The combination with an axle and its bearing, of a wheel having a hub extending into the axle bearing, said hub having a closed outer end, a roller bearing cage arranged within the bore of said hub, a cup-shaped member embracing the outer end of said axle connected to said roller bearing cage, and means for rotatably securing said hub and cup-shaped member on said axle.

4. A mine car wheel having a hub provided with a closed outer end and open inner end, a bearing cage disposed in the bore of said hub, a member carried by said bearing cage, an axle upon which said wheel is mounted, and means for rotatably securing said member and hub on said axle.

5. A mine car wheel attaching device comprising a wheel having a hub provided with a bore to receive an axle, said bore having a roller bearing cage mounted therein, a member embracing the axle having a connection with said roller bearing cage, and means for rotatably securing said wheel and member on said axle.

6. The combination with an axle having an annular groove adjacent its outer end, of a wheel hub having a bore to receive said axle and provided with a closed outer end, a roller bearing cage arranged within said bore, a member embracing the outer end of said axle having openings in alinement with the groove thereof, integral means for securing said member to one end of said roller bearing cage, and spaced bolts passing through the hub of said wheel openings of said member and groove of said axle for rotatably securing said wheel on said axle.

7. A mine car wheel having a hub provided with a closed outer end, a bearing cage arranged within said hub, a cup-shaped member arranged over the outer end of said axle having integral tongues adapted to embrace the outer end of the bearing cage, and means for rotatably securing said hub and member on the axle.

8. A mine car wheel having a hub provided with a closed outer end, a bearing cage disposed in said hub, an axle upon which said hub is mounted having an annular groove adjacent its outer end, a cup-shaped member arranged over the outer end of said axle having reinforcing ribs and provided with tongues for securing it to the outer end of the bearing cage, and bolts passing through said hub cup-shaped member and groove of said axle for rotatably securing said hub and bearing cage on said axle.

In testimony whereof I hereunto affix my signature.

JOHN H. RUTHERFORD.

Copies of this patent may be obtained for five cents each, by addressing the "Commissioner of Patents, Washington, D. C."